(12) United States Patent
Dirkx et al.

(10) Patent No.: US 7,470,644 B2
(45) Date of Patent: Dec. 30, 2008

(54) PROCESS FOR COMBUSTING COKE

(75) Inventors: Jacobus Mathias Hendrikus Dirkx, Amsterdam (NL); Richard Joseph Higgins, Norco, LA (US); Rene Samson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 615 days.

(21) Appl. No.: 10/509,004

(22) PCT Filed: Mar. 27, 2003

(86) PCT No.: PCT/EP03/03244

§ 371 (c)(1), (2), (4) Date: Sep. 24, 2004

(87) PCT Pub. No.: WO03/080766

PCT Pub. Date: Oct. 2, 2003

(65) Prior Publication Data

US 2005/0227850 A1    Oct. 13, 2005

Related U.S. Application Data

(60) Provisional application No. 60/368,066, filed on Mar. 27, 2002.

(51) Int. Cl.
*B01J 8/24* (2006.01)
*B01J 8/26* (2006.01)
*B01J 20/34* (2006.01)
*B01J 38/12* (2006.01)
*B01J 38/22* (2006.01)
*B01J 38/28* (2006.01)
*B01J 38/30* (2006.01)
*B01J 38/32* (2006.01)

(52) U.S. Cl. .............. 502/44; 502/38; 502/41; 502/45; 502/46

(58) Field of Classification Search ............ 502/38, 502/41, 45, 46, 44
See application file for complete search history.

(56) References Cited

U.S. PATENT DOCUMENTS 4,050,902 A * 9/1977 Pulak .................. 422/144
4,325,817 A * 4/1982 Bartholic et al. ............ 208/164

(Continued)

FOREIGN PATENT DOCUMENTS

EP    1487940 B1    6/2006

OTHER PUBLICATIONS

Robert A. Meyers, Handbook of Petroleum Refining Processes, McGraw-Hill 1996 Part 3, pp. 3.3-3.112.

(Continued)

*Primary Examiner*—Timothy C Vanoy
*Assistant Examiner*—Serena L Hanor
(74) *Attorney, Agent, or Firm*—William Edward Hickman

(57) ABSTRACT

The invention pertains to a process for combusting coke of a coke-containing FCC catalyst in a regeneration unit of a FCC unit having the introduction of oxygen-containing gas through a gas-transport unit into the regeneration unit and combusting the coke by means of an oxygen-containing gas, in which the oxygen-containing gas is cooled in a cooling unit before it is brought in contact with the coke-containing FCC catalyst. The invention further relates to an apparatus for performing said process.

14 Claims, 1 Drawing Sheet

U.S. PATENT DOCUMENTS

Figure 1:
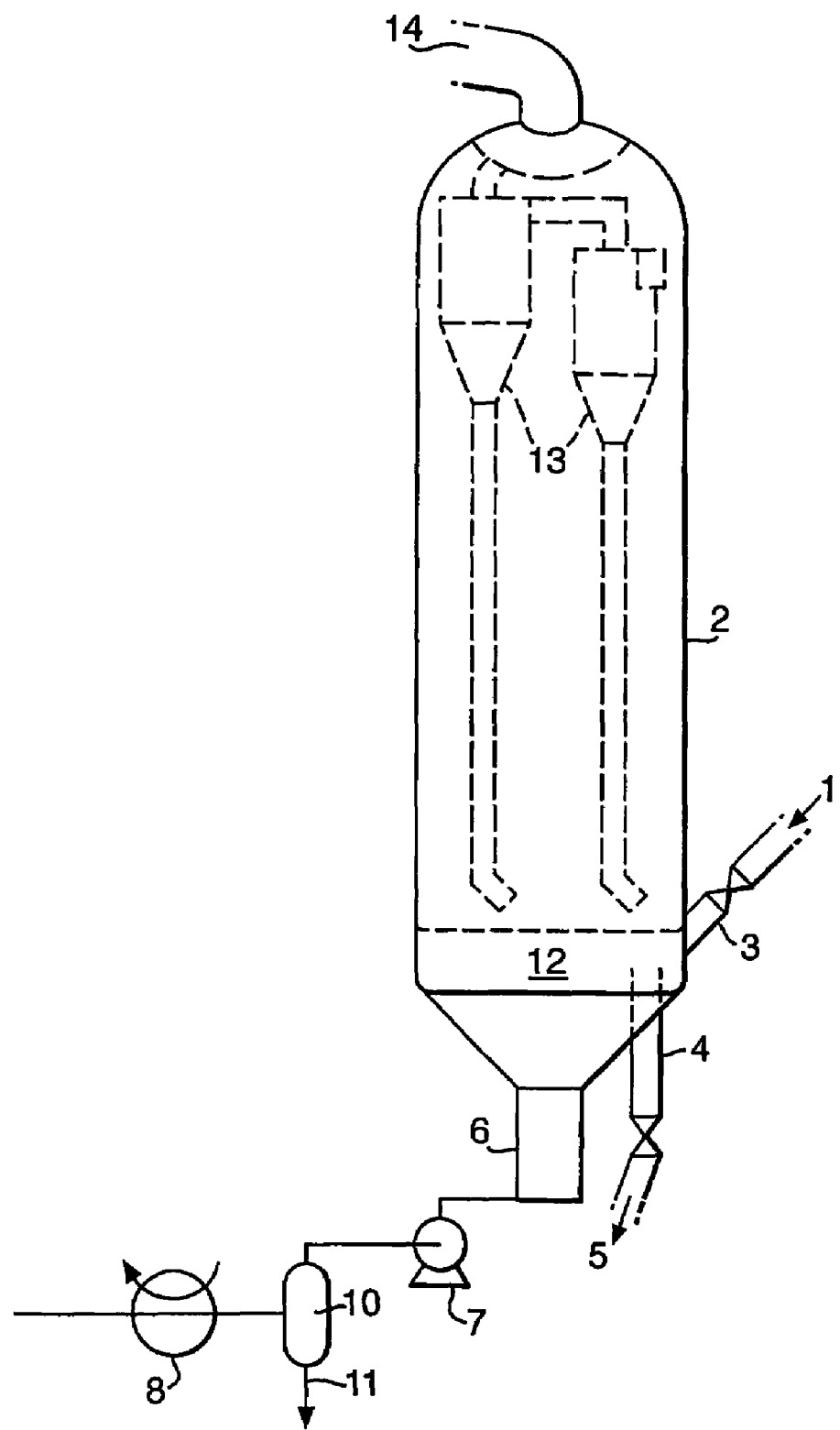

| | | | | |
|---|---|---|---|---|
| 4,396,531 A | * | 8/1983 | Lomas | 502/22 |
| 4,542,114 A | * | 9/1985 | Hegarty | 502/39 |
| 4,595,567 A | * | 6/1986 | Hedrick | 422/146 |
| 5,002,915 A | * | 3/1991 | Harandi et al. | 502/51 |
| 5,043,517 A | * | 8/1991 | Haddad et al. | 585/533 |
| 5,346,613 A | * | 9/1994 | Lomas et al. | 208/164 |
| 5,451,313 A | * | 9/1995 | Wegerer et al. | 208/164 |
| 5,538,623 A | * | 7/1996 | Johnson et al. | 208/120.01 |
| 5,800,697 A | * | 9/1998 | Lengemann | 208/159 |
| 5,908,804 A | * | 6/1999 | Menon et al. | 502/38 |
| 2005/0227850 A1 | * | 10/2005 | Dirkx et al. | 502/38 |

OTHER PUBLICATIONS

Perry's Chemical Engineers' Handbook, 6$^{th}$ Edition, 1984, pp. 6-24.
Perry's Chemical Engineers' Handbook, 6$^{th}$ Edition 1984, pp. 11-28.

* cited by examiner

PROCESS FOR COMBUSTING COKE

This Application is a National Stage entry under §371 of PCT Application PCT/EP03/03244, filed Mar. 27, 2003, which claims priority to U.S. Provisional Application 60/368,066, filed Mar. 27, 2002.

The present invention pertains to a process for combusting coke of a coke-containing fluid catalytic cracking (FCC) unit in a regeneration unit of a FCC unit and to a corresponding apparatus for performing said process.

Fluidized catalytic cracking (FCC) processes operate by circulating catalyst particles continuously from a reactor in which a hydrocarbon feed is cracked to lower boiling products, during which carbonaceous material is deposited on the catalyst. The catalyst is then passed to a regenerator in which the carbonaceous material is combusted to restore the catalyst activity, to heat up the catalyst (necessary to supply heat for the endothermic cracking reactions on the reactor side) and returning catalyst particles to the reactor. Such a process and reactors for performing these processes are known in the art. Reference is made to Robert A. Meyers, Handbook of Petroleum Refining Processes, McGraw-Hill (1996), particularly Part 3, pp. 3.3-3.112.

The present invention relates to the regeneration step in the FCC-process. In this step the carbonaceous material ("coke") that has been formed on the surface and in the pores of the catalyst during the reaction step is (partly or completely) removed from the catalyst by combustion with an oxygen-containing gas.

In this combustion process, inevitably the catalyst is irreversibly damaged. This damage is accelerated by high temperatures, high steam partial pressure and by certain contaminants (principally vanadium- and nickel-containing compounds), which stem from the hydrocarbon feedstock and which are deposited on the catalyst during the cracking reactions. In order to maintain the catalytic activity at a certain level, it is customary to replace a certain amount of the catalyst inventory from the unit with fresh catalyst on a regular basis. The term "regular" in this context refers to the frequency with which this replacement is carried out. Depending on the degree of automation of the FCC unit, the time interval between catalyst replacements may vary from a few minutes to a few days.

Refiners have taken several measures to reduce the irreversible damage to the catalyst as much as possible. This damage is called "hydrothermal deactivation" because of the prominent role of temperature and steam. One commonly employed stratagem is to limit the amount of contaminants on the catalyst. Many refiners maintain a closely watched upper limit on e.g. the amount of vanadium and nickel on the catalyst and adjust their catalyst replacement rate (the so-called "make-up rate") so that this upper limit is not exceeded.

It is more difficult to regulate temperature and steam partial pressure in the regenerator. The regenerator temperature is not simple to control in this respect, since this is dictated by the heat balance of the unit (the heat requirements on the reactor side). Steam partial pressure likewise is not simple to control. A large amount of the steam in the regenerator is a co-product of the combustion reactions and hence is dictated by the amount of coke burnt, which again is dictated by the heat balance of the unit.

Some refiners have found a way around this problem, which is conceptually sound but very costly. Their solution is to split the combustion process over two different vessels. It is well known (see the above mentioned handbook of Meyer, p. 3.91) that hydrogen burns faster than carbon. As a result, the majority of the steam is generated in the first stage of the combustion process. By staging the combustion, one achieves a situation in which the majority of the steam is generated at a relatively low combustion temperature in the first stage, while the final temperature-increase in the second stage takes place at a relatively low steam partial pressure. Since it is the combination of a high temperature and a high steam partial pressure, which is particularly harmful for the catalyst, this method of combustion limits the hydrothermal deactivation of the catalyst. The downside of this method is that it implies a very substantial increase in capital cost of the unit. In addition, one extra vessel also implies more transport lines for the catalyst, which are always vulnerable pieces of equipment that frequently give rise to operational problems.

There is therefore a need for a much simpler and much less costly stratagem, which achieves the same goal, namely diminishing the rate of catalyst deactivation.

The present invention has as its object to provide improved combustion of coke at low hydrothermal deactivation, which is suitable in any regenerator, including in a one-stage regenerator. The invention relates to a method and an apparatus wherein oxygen-containing gas, preferably air, is cooled before introduction into the regeneration unit.

The invention resides in a process for combusting coke of a coke-containing FCC catalyst in a regeneration unit of a FCC unit comprising the introduction of oxygen-containing gas through a gas transport unit into the regeneration unit and combusting the coke by means of the oxygen-containing gas, characterized in that the oxygen-containing gas is cooled in a cooling unit before it is brought in contact with the coke-containing FCC catalyst.

The cooling unit allows the gas transport unit to transport more gas (in terms of weight) to the regeneration unit, thereby increasing the capacity of the regeneration process. Adding a cooling step to an existing FCC regenerator process is thus a method to increase the capacity of such a unit.

Cooling furthermore lowers the dew point of water present in the gas, thereby giving condensation of water. This condensed water is suitably separated from the gas before the gas is used in the regenerator process. The oxygen-containing gas therefore contains less water than non-cooled gas. It was found that this was very beneficial for the average lifetime of the catalyst, since less catalyst was irreversibly destructed by hydrothermal deactivation of the (zeolite) catalyst at the high temperatures (typically around 680° C.) that are used in the regeneration process. Reduction of moisture in the oxygen-containing gas, for instance, from 2.8 wt % to 0.8 wt % or less is easily obtainable with the present process.

From a practical standpoint it is preferred that the oxygen-containing gas is cooled before or during its stay in the gas transport unit. More preferably the oxygen-containing gas is cooled before its stay in the gas transport unit.

The oxygen-containing gas may be any gas that contains oxygen, and most preferably such oxygen-containing gas is air.

In another aspect the invention pertains to a method for decreasing the thermal deactivation of a catalyst in an FCC regeneration process, characterized in that the regeneration process is performed by applying the above-mentioned process.

In yet another aspect the invention pertains to an apparatus for performing the above process comprising a reactor unit with inlet and outlet means, a regenerator unit with inlet means that are connected to the outlet means of the reactor unit and outlet means that are connected to the inlet means of the reactor unit, characterized in that the apparatus further comprises a gas transport unit located in or at inlet means of the regenerator unit, and a cooling unit in the transport unit or upstream of the transport unit at its suction side.

The invention is further described in the following FIGURES.

FIG. 1 is a block scheme of an apparatus of the invention;

In FIG. 1 a reactor unit (not shown) forms a cycle with regenerator unit 2. The fluid catalyst is continuously transferred from reactor unit 1 to regenerator unit 2, and from regenerator unit 2 back to reactor unit 1 through inlet and outlet means 3, 4, 5. Through inlet means 6 air (or another oxygen-containing gas) is introduced into the regenerator unit 2 for use as oxygen source in the coke combustion. Regenerator unit 2 and reactor 1 are kept at the required temperature and pressure with means that are commonly used in these processes. Air is continuously introduced by using gas transport unit 7. There is provided a cooling unit 8 upstream of transport unit 7. Transport unit 7 is preferably an air blower such as known to the skilled person, for instance from Perry's Chemical Engineers' Handbook; 6th Edition (1984). See pages 6-24, which deal with rotary blowers. This is the type of machine that preferably is used to compress FCC air. The air that is introduced is cooled by using a cooling unit 8. The cooling unit 8 is preferably located upstream at the suction side of the blower 7, but in other types of gas transport units 7 cooling may also be performed within the gas-transport unit 7. Between cooling unit 8 and gas transport unit 7 a separation vessel 10 is present to separate water via 11 from the cooled air. Among the cooling units 8 that may be used are conventional industrial chillers, for instance those as have been described in Perry's Chemical Engineers' Handbook; 6th Edition (1984); pages 11-28. These chillers may be referred to as refrigeration machines. The energy for these machines can be either provided by a steam turbine or electrically. It will depend on local refinery conditions which form of energy supply is the preferred route. Usually these machines are cooled by cooling fluids such as freon or ammonium. Cooling machines that use water as coolant may also be used.

The regenerator 2 in FIG. 1 is also provided with a dense fluidized bed 12, cyclone separators 13 and gas outlet 14.

The process of the invention typically provides temperature differentials from 35 to 10.degree. C. The effect is the greatest in summer and in countries with a hot (humid) climate. Preferably the temperature of the air before being cooled is higher than 25.degree. C., more preferably higher than 30.degree. C. The advantages of the invention are especially found when the content of water in air before cooling is between 50 and 100% and preferably between 75 100% of total saturation (humidity). The following is an illustrative example of the benefits of this invention. In a unit with a feed intake of 16,000 t/d (tons/day) (typical coke burn rate=870 t/d; typical catalyst make-up rate=7 t/d): the reduction in catalyst make-up rate reduction during the summer months would be 0.8 t/d; and during the winter months: 0.2 t/d. The yearly average reduction in catalyst make-up rate is 0.4 t/d; corresponding to roughly $300,000 per year savings of catalyst consumption.

We claim:

1. A process for combusting coke of a coke-containing fluid catalytic cracking (FCC) catalyst in a regeneration unit of a FCC unit comprising the introduction of oxygen-containing gas through a gas transport unit into the regeneration unit and combusting the coke with an oxygen-containing gas, wherein the oxygen-containing gas is cooled in a cooling unit to a temperature below the dew point of water present in the gas thereby giving condensation of water, wherein the condensed water is separated from the gas before it is brought in contact with the coke-containing FCC catalyst, wherein the oxygen-containing gas has a water content before cooling of between 50 and 100% of total saturation.

2. The process of claim 1, wherein the oxygen-containing gas is cooled before or during its stay in the gas transport unit.

3. The process of claim 2 wherein the oxygen-containing gas is cooled before its stay in the gas transport unit.

4. The process of claim 3 wherein the oxygen-containing gas is air.

5. The process of claim 4, wherein the air has a temperature higher than 25° C. before cooling.

6. The process of claim 5, wherein the air is cooled with a temperature differential from 35 to 10° C.

7. The process of claim 6 wherein the gas transport unit is an air blower.

8. The process of claim 7 wherein cooling is performed in an industrial chiller.

9. A regenerator apparatus for performing the process of claim 8, comprising inlet and outlet means and an inlet, wherein the apparatus further comprises a gas transport unit located in or at inlet means of the regenerator unit, and a cooling unit in the transport unit or upstream the transport unit at its suction side.

10. A method for decreasing the thermal deactivation of a catalyst in a fluid catalytic cracking (FCC) regeneration process, wherein the regeneration process is performed by applying the process for combusting coke of a coke-containing FCC catalyst in a regeneration unit of a FCC unit comprising the introduction of oxygen-containing gas through a gas transport unit into the regeneration unit and combusting the coke with an oxygen-containing gas, wherein the oxygen-containing gas is cooled in a cooling unit to a temperature below the dew point of water present in the gas thereby giving condensation of water, wherein the condensed water is separated from the gas before it is brought in contact with the coke-containing FCC catalyst, wherein the oxygen-containing gas has a water content before cooling of between 50 and 100% of total saturation.

11. A process for regenerating an FCC catalyst containing coke, said process comprises:
    cooling an oxygen-containing gas, having a water content and a non-cooled temperature, to a temperature below the dew point temperature of said oxygen-containing gas to thereby provide a cooled gas containing condensed water;
    separating said condensed water from said cooled gas to provide a separated cooled gas, wherein the oxygen-containing gas has a water content before cooling of between 50 and 100% of total saturation; and,
    introducing said separated cooled gas into an FCC regenerator, wherein said separated cooled gas is contacted with said FCC catalyst under coke combustion conditions.

12. A process as recited in claim 11, wherein said oxygen-containing gas comprises air.

13. A process as recited in claim 12, wherein said oxygen-containing gas has a temperature higher than 25° C. before cooling.

14. A process as recited in claim 13, wherein said temperature is from 10° C. to 35° C. below said non-cooled temperature.

\* \* \* \* \*